(12) United States Patent
Mos

(10) Patent No.: US 8,468,710 B1
(45) Date of Patent: Jun. 25, 2013

(54) DEVICE AND METHOD FOR MARKING ONE OR MORE POINTS WITH DUST

(76) Inventor: Mihai Mos, Lawrenceville, NJ (US)

(*) Notice: Subject to any disclaimer, the term of this patent is extended or adjusted under 35 U.S.C. 154(b) by 119 days.

(21) Appl. No.: 13/287,103

(22) Filed: Nov. 1, 2011

(51) Int. Cl.
*G01B 3/10* (2006.01)

(52) U.S. Cl.
USPC .......................................................... 33/668

(58) Field of Classification Search
USPC .................................. 33/668, 759, 760, 761
See application file for complete search history.

(56) References Cited

U.S. PATENT DOCUMENTS

| | | | |
|---|---|---|---|
| 4,015,337 A | 4/1977 | Taylor | |
| 4,296,554 A | 10/1981 | Hammerstrom | |
| 4,630,376 A | 12/1986 | Pentecost | |
| 4,765,557 A * | 8/1988 | Kahmann | 33/767 |
| 6,434,854 B1 | 8/2002 | MacColl et al. | |
| 6,701,635 B2 * | 3/2004 | Scarborough | 33/761 |
| 7,040,035 B1 * | 5/2006 | Scarborough | 33/668 |
| 7,086,174 B2 * | 8/2006 | Scarborough | 33/761 |
| 7,269,913 B2 * | 9/2007 | Holevas | 33/668 |
| 7,334,344 B2 * | 2/2008 | Scarborough | 33/759 |
| 2005/0198850 A1 * | 9/2005 | Scarborough | 33/761 |
| 2006/0112582 A1 * | 6/2006 | Scarborough | 33/668 |
| 2006/0185185 A1 * | 8/2006 | Scarborough | 33/759 |
| 2007/0107248 A1 * | 5/2007 | Jones | 33/760 |
| 2008/0301961 A1 * | 12/2008 | Nepil et al. | 33/414 |
| 2009/0025237 A1 * | 1/2009 | Alexander | 33/414 |

* cited by examiner

Primary Examiner — Yaritza Guadalupe-McCall
(74) Attorney, Agent, or Firm — LaMorte & Associates, P.C.

(57) ABSTRACT

A device for depositing a dust mark. The device utilizes a linear guide having a first end, a second end, and a stop. A dust receptacle reciprocally moves along the linear guide between the stop and a higher point. This enables the dust receptacle to be moved into a cocked position above the stop. The dust receptacle defines an interior chamber with a discharge opening. The interior chamber is filled with marking dust. A biasing element is used to bias the dust receptacle against the stop. A mechanism is provided for applying force to the dust receptacle in opposition of the biasing element. This cocks the dust receptacle and moves the dust receptacle away from the stop. When the dust receptacle is released from its cocked position, the biasing element returns the dust receptacle to the stop. This causing a volume of the marking dust to exit.

17 Claims, 5 Drawing Sheets

DEVICE AND METHOD FOR MARKING ONE OR MORE POINTS WITH DUST

BACKGROUND OF THE INVENTION

1. Field of the Invention

In general, the present invention relates to devices for marking a point, or a series of points, on a surface as determined by a tape measure, stud finder, or similar tool. More particularly, the present invention relates to devices and methods for marking one or more points with a deposit of chalk dust.

2. Prior Art Description

There are many hand tools that measure distance, angles, depths, and the like. When these tools are used to measure a surface, the user of the tool typically marks the measurement on that surface using a pencil or similar marker. Using both a measurement tool and a pencil typically requires a handyman to use both hands. Often, both hands are often not free to use. Accordingly, many hand tools have been designed over the years that contain integral marking systems. These hand tools enable a handyman to both make a measurement and mark a measurement using one hand.

One of the most common measurement tools used by construction workers and handymen is the tape measure. The tape measure is typically used for measuring lengths along a surface. In the prior art, several tape measures have been designed with markers that can mark a measurement on a surface. Such prior art marks the surface in a couple of ways. Some tape measures have ink markers or graphite pencil markers that can be pressed against a surface to make a mark. Such prior art is exemplified by U.S. Pat. No. 4,015,337 to Taylor, entitled Combined Tape Measure And Marking Device; U.S. Pat. No. 4,296,554 to Hammerstrom, entitled Tape Measure and Marking Device, and U.S. Pat. No. 6,434,854 to MacColl, entitled Integrated Marking And Tape Measure.

In the prior art, some tape measures mark using a pin that cuts an indentation into the surface being measured. Such prior art is exemplified by U.S. Pat. No. 4,630,376 to Pentecost, entitled Marking Device For A Tape Measure. Still other tape measures contain caulk line mechanisms that utilize a caulk covered line to mark an underlying surface. Such prior art marking systems are exemplified by U.S. Pat. No. 7,086,176 to Scarbourough, entitled Tape measure That Incorporates A Belt Type Marking Device.

Each of the prior art marking techniques have disadvantages. Prior art marking systems that use ink, pencil graphite or chalk dust are prone to smearing. This is especially true of the underlying surface is wet Furthermore, many ink-based marking systems have a tendency to permanently mark the underlying surface. This is especially true if the ink mark is left to dry over time. Accordingly, such marking systems cannot be employed on surfaces that are to remain pristine.

Similarly, marking systems that scratch a mark cannot be used on surfaces that are intended to remain pristine. Rather, such marking systems can only be used on unfinished soft surfaces, such as construction lumber. Furthermore, marking systems that scratch marks simply cannot be used on hard surfaces such as glass, ceramic, hardened steel, granite and the like.

Prior art marking systems that rely upon pencil graphite or chalk dust need a sharp point or a sharp edged wheel to make physical contact between the surface being marked and the graphite or chalk dust. That is the pencil marker must run across the surface being marked, or the caulk line must be pressed by a wheel against the surface being marked. In either scenario, surface conditions, such as the presence or water, oil, sawdust or the like can prevent the marking system from working and may even clog the marking system, causing it to fail. Furthermore, the pressure of the pencil point or wheel can create indents if a soft surface is being marked.

A need therefore exists for a marking device and method that can be used with any measuring, detecting or imprinting tool to mark a surface, regardless of the material of that surface and without permanently marring the marked surface. A need also exists for a marking device that can be used to create a mark on a surface without the dispensing element of the device physically touching the surface being marked. These needs are met by the present invention as described and claimed below.

SUMMARY OF THE INVENTION

The present invention is a device for depositing a precise and well defined dust mark on a surface. The device can be configured as an independent tool or as part of a measurement, detecting or imprinting tool. The device utilizes a linear guide. The linear guide has a first end, a second end, and a stop that is proximate the second end.

A dust receptacle is provided that reciprocally moves along the linear guide between the stop and a point a predetermined distance above the stop. This enables the dust receptacle to be moved into a cocked position above the stop. The dust receptacle defines an interior chamber and has a discharge opening that leads into the interior chamber. The interior chamber is at least partially filled with a volume of marking dust.

A biasing element is used to bias the dust receptacle toward the stop on the linear guide. In a manual operated configuration, an engagement tab is provided for manually applying force to the dust receptacle in opposition of the biasing element. In automated configurations, the dust receptacle can be used by an electro-mechanical mechanism. Either way, the dust receptacle is becomes cocked as it moves away from the stop along the linear guide. When the dust receptacle is released from its cocked position, the biasing element rapidly moves the dust receptacle along the linear guide to the stop. This causing a volume of the marking dust to exit the discharge opening and be deposited onto an adjacent surface in a precise position.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
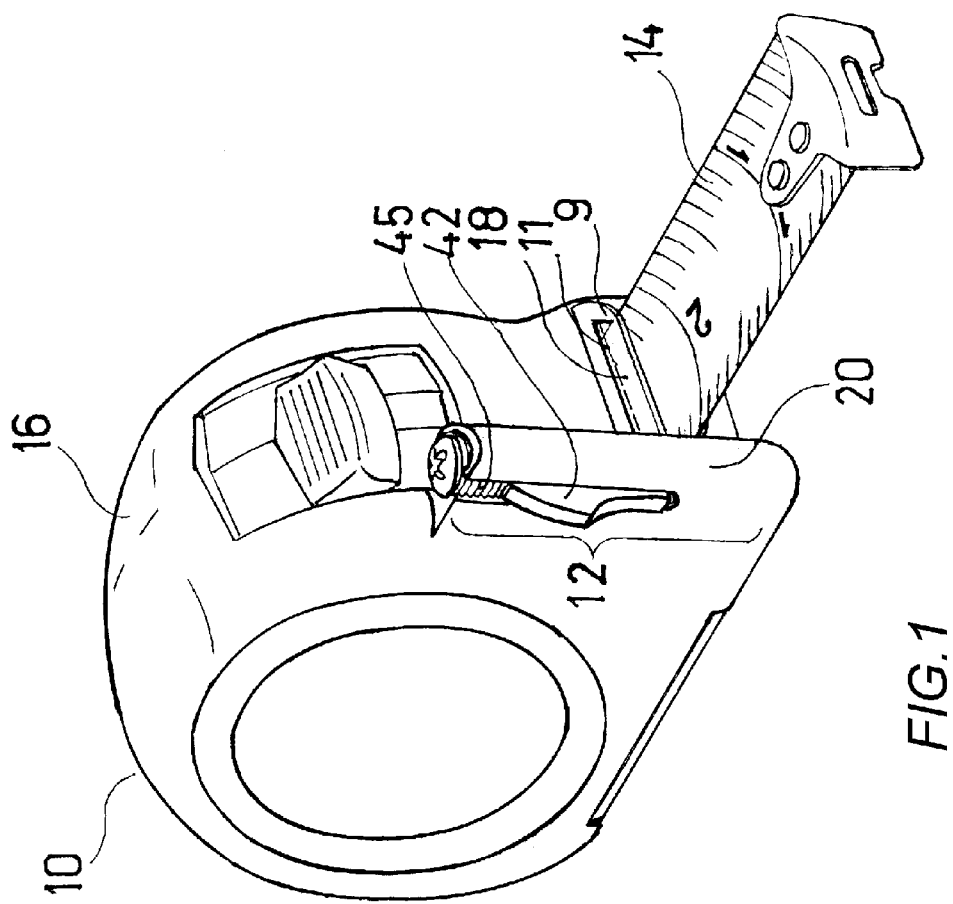
FIG. 1 is a perspective view of a first exemplary embodiment of the present invention.
Figure 2:
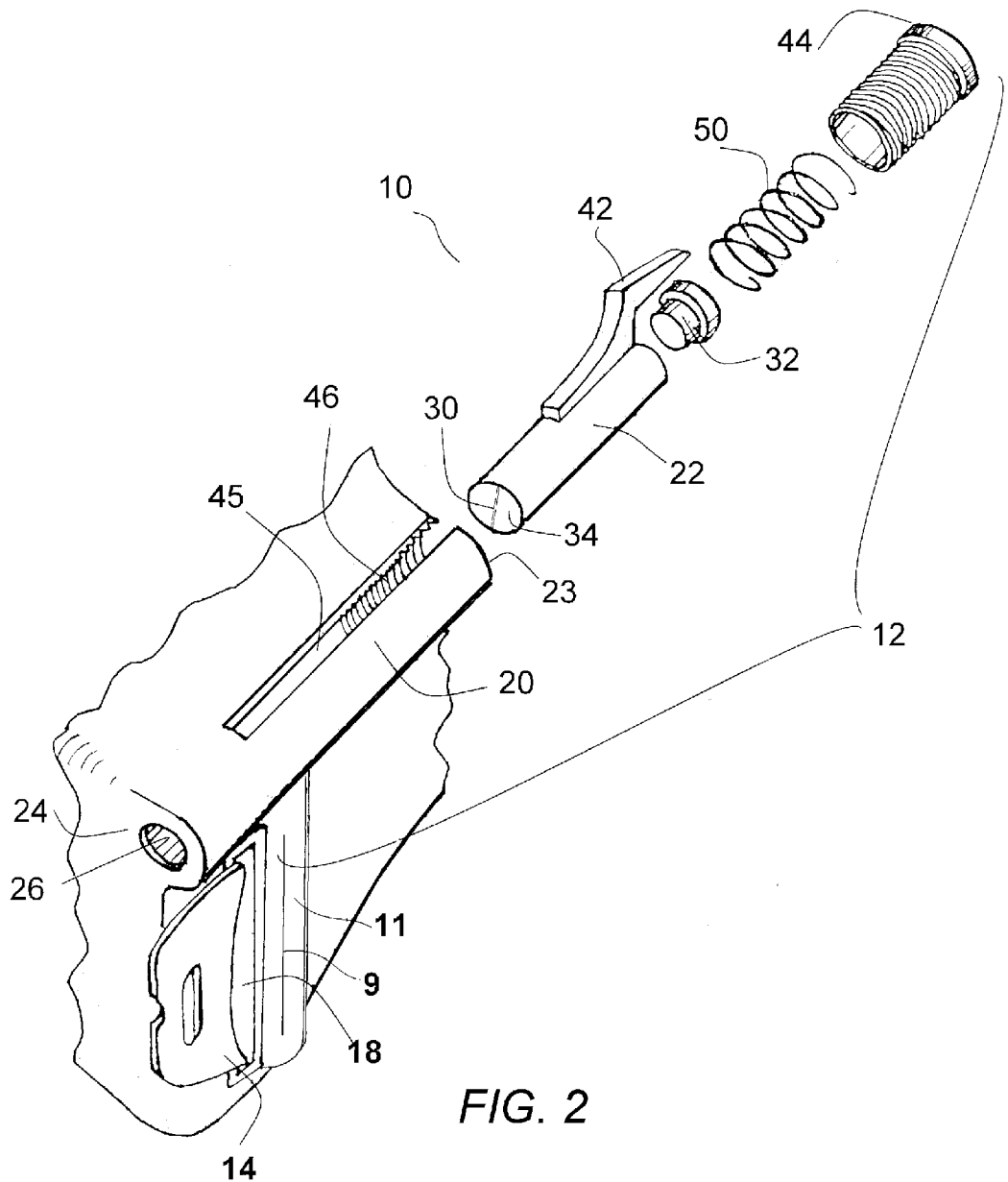
FIG. 2 is an exploded view of the marking mechanism contained within the embodiment of FIG. 1.

Although the present invention marking device can be embodied in many different tools, the embodiments illustrated show the marking device being used on both a tape measure and a stud finder. These embodiments are selected in order to set forth two of the best modes contemplated for the invention. The illustrated embodiments, however, are merely exemplary and should not be considered limitations when interpreting the scope of the appended claims.

Referring in unison to FIG. 1, FIG. 2, FIG. 3, and FIG. 4, a specialized tape measure assembly 10 with a marking mechanism 12 is shown. The tape measure assembly 10 has a housing 16 that retains a delineated tape 14 in the traditional manner. The tape 14 extends from the housing 16 through a tape opening 18. An alignment plate 11 is disposed proximate the tape opening 18. The alignment plate 11 contains an alignment mark 9 that serves as a measurement line when markings are read from the tape 14.

The marking mechanism 12 is positioned adjacent the tape opening 18. In the shown embodiment, the marking mechanism 12 is integrally formed into the housing 16 of the tape measure assembly 10. However, this is merely a preferred manufactured condition. The marking mechanism 12 can also be retroactively added to the exterior of the housing 16 if so desired by a manufacturer. This can be achieved by attaching a support to the tape measure housing that holds the marking mechanism 12.

The marking mechanism 12 utilizes a linear guide 20 that is vertically oriented. The purpose of the linear guide 20 is to guide the vertical movements of a dust receptacle 22. In the shown embodiment, the linear guide 20 is a tube and the dust receptacle 22 moves up and down inside the linear guide 20. However, it should be understood that the linear guide 20 can also be a track, wherein the dust receptacle 22 moves up and down along the exterior of the track.

The linear guide 20 has a first end 23, a second end 24, and a stop 26 that is positioned proximate the second end 24. The dust receptacle 22 reciprocally moves relative the linear guide 20 in a range between the stop 26 and some point that is a predetermined distance above the stop 26. The dust receptacle 22 defines an interior chamber 28. The interior chamber 28 has an open first 23 at one end and a shaped narrow discharge opening 30 at the opposite end. The open first 23 of the dust receptacle 22 can be selectively sealed with a removable closure 32.

Figure 3:
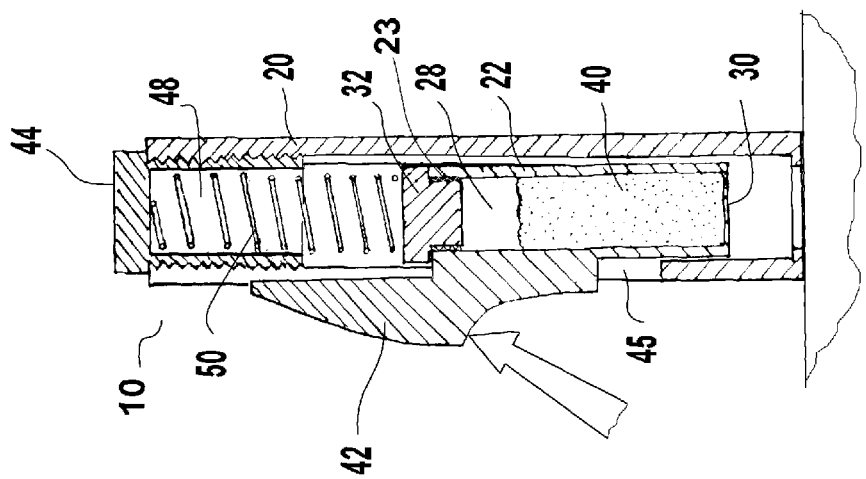
FIG. 3 is a cross-sectional view of the marking mechanism shown in a cocked condition.
Figure 4:
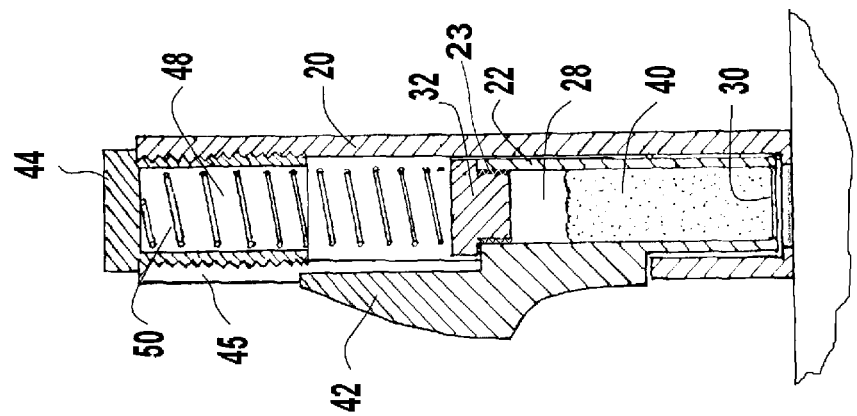
FIG. 4 is a cross-sectional view of the marking mechanism in a fired condition.
Figure 5:
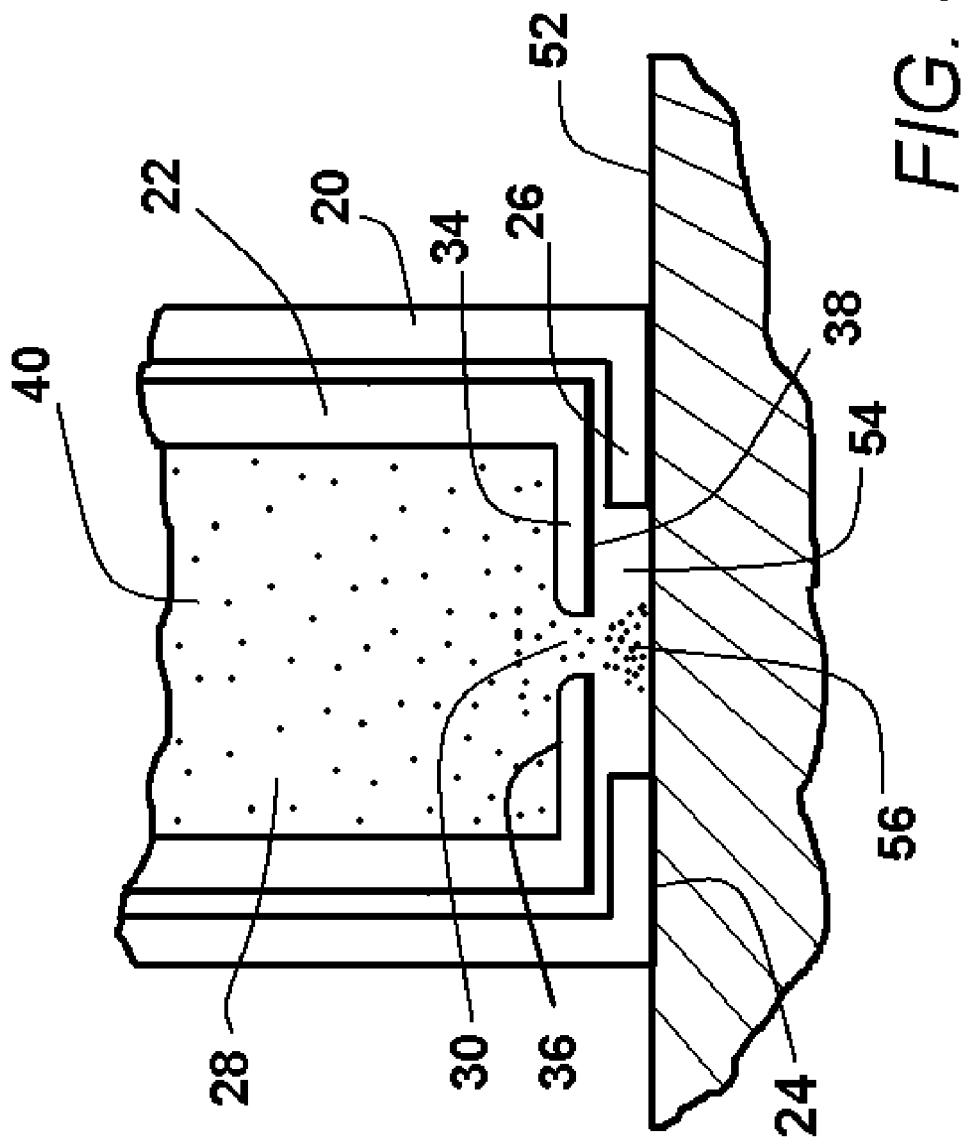
FIG. 5 is an enlarged cross-sectional view of the area surrounding the discharge opening within the marking mechanism.

Referring to FIG. 5 in conjunction with FIGS. 1-4, it can be seen that the discharge opening 30 extends through a bottom panel 34 of the dust receptacle 22. The shape of the discharge opening 30 is not uniform as it extends through the bottom panel 34 of the dust receptacle 22. Rather, the discharge opening 30 is widest along the upper surface 36 of the bottom panel 34 that faces into the interior chamber 28. The discharge opening 30 tapers down to a more narrow shape at the lower surface 38 of the bottom panel 34 that faces away from the internal chamber 28. Furthermore, the edges of the discharge opening 30 along the upper surface 36 and the lower surface 38 are preferably rounded so that marking dust 40 can better flow through the discharge opening 30 without binding and possibly clogging the discharge opening 10.

A volume of marking dust 40 is used to fill the interior chamber 28 of the dust receptacle 22. The marking dust 40 can be chalk dust or any other dust capable of marking a surface. The marking dust 40 can be any color and any degree of permanency.

An engagement tab 42 extends laterally from the dust receptacle 22. The engagement tab 42 passes through a slot 45 that runs vertically along the linear guide 20. In this manner, the presence of the engagement tab 42 does not inhibit the ability of the dust receptacle 22 to move reciprocally within the confines of the linear guide 20.

A cap 44 is used to seal the open first end 23 of the linear guide 20. The cap 44 engages the linear guide 20 with a threaded connection 46 or similar twist and lock connection. The cap 44 may contain a screwdriver slot configuration on it top so that it can be easily engaged and turned with a screwdriver. When the cap 44 is in place, a spring chamber 48 is defined inside the linear guide 20 between the cap 44 and the dust receptacle 22.

A biasing element is placed inside the spring chamber 48 under the end cap 44. The biasing element can be any arrangement that biases the dust receptacle 2 down toward the second end 24 of the linear guide 20. The biasing element can also be a set of opposed magnets, a small piston, a segment of elastomeric material or even an electromagnet. However, in the preferred illustrated embodiment, the biasing element is a spring 50. The spring 50 extends between the cap 44 and the removable closure 32 of the dust receptacle 22. Accordingly, the biasing force provided by the spring 50 biases the dust receptacle 22 down against the stop 26 in the linear guide 20.

When the marking mechanism 12 is at rest, the biasing force of the spring 50 slightly presses the dust receptacle 22 against the stop 26 near the second end 24 of the linear guide 20. The discharge opening 30 at the bottom of the dust receptacle 22 is positioned a short distance above the second end 24 of the linear guide 20 and the bottom of the housing 16. Consequently, the discharge opening 30 does not touch the measured underlying surface 52 and residual marking dust 40 at the discharge opening 30 will not smear onto the underlying surface 52 if the tape measure assembly 10 moves. Furthermore, due to the very narrow discharge opening 30, the flow of dust through the discharge opening 30 does not occur after operation, thereby leaving no excess caulk dust to smear.

Referring now to FIG. 3, it can be seen that to use the marking mechanism, a user pulls the engagement tab 42 upwardly with a force that is greater than that provided by the spring 50. This causes the spring 50 to compress and the dust receptacle 22 to rise up against the bias of the spring 50. The manual force is applied until the dust receptacle 22 reaches a predetermined height. The engagement tab 42 is then suddenly released. Upon the release, the bias provided by the spring 50 causes the dust receptacle 22 to rapidly return to the position shown in FIG. 4.

Referring to FIG. 4 and FIG. 5, it will be understood that when the dust receptacle 22 strikes the stop 26 on the linear guide 20, it stops. The marking dust 40 within the dust receptacle 22 develops momentum as the dust receptacle 22 accelerates toward the stop 26. When the dust receptacle 22 strikes the stop, the marking dust 40 decelerates against the bottom panel 34 of the dust receptacle 22, wherein the momentum of the marking dust 40 causes a small volume of the marking dust 40 to pass through the discharge opening 30. The discharge of marking dust 40 mimics the shape and size of the discharge opening 30. In the illustrated embodiment, the discharge opening 30 is shaped as a narrow slot. Consequently, a line of marking dust 40 passes through the discharge opening 30 that has the same length and width as the bottom of the discharge opening 30.

As the marking dust 40 moves out of the discharge opening 30, it travels across a gap 54 between the stop 26 and the underlying surface 52. The marking dust 40 then is deposited onto the underlying surface 52. Since the marking dust 40 is applied by being deposited upon the underlying surface 52, a deposited mark 56 is made regardless of the characteristics of the underlying surface material. For example, even if the underlying surface 52 were highly polished glass, the deposited mark 56 would lay upon the surface and present a visible mark. There only needs to be superficial cohesion between the deposited mark 56 and the underlying surface 52 for the system to work.

The amount of marking dust 40 deposited by use of the marking mechanism 12 depends upon the dimensions of the slot and the amount of distance the dust receptacle 22 was cocked before it was released. As has been previously stated, the bias of the spring 50 controls the acceleration of the dust receptacle 22 when it is released from its cocked position. Through use and experience, a user will learn how to create light and dark markings by varying the height that the dust receptacle 22 is cocked against the spring 50 prior to producing a mark.

In the embodiment of FIGS. 1-5, the marking mechanism 12 was shown affixed to a tape measure assembly 10. It will be understood that the marking mechanism 12 need not be part of a tape measure, but rather can operate on its own or as part of another measuring, detecting or imprinting tool.

Figure 6:
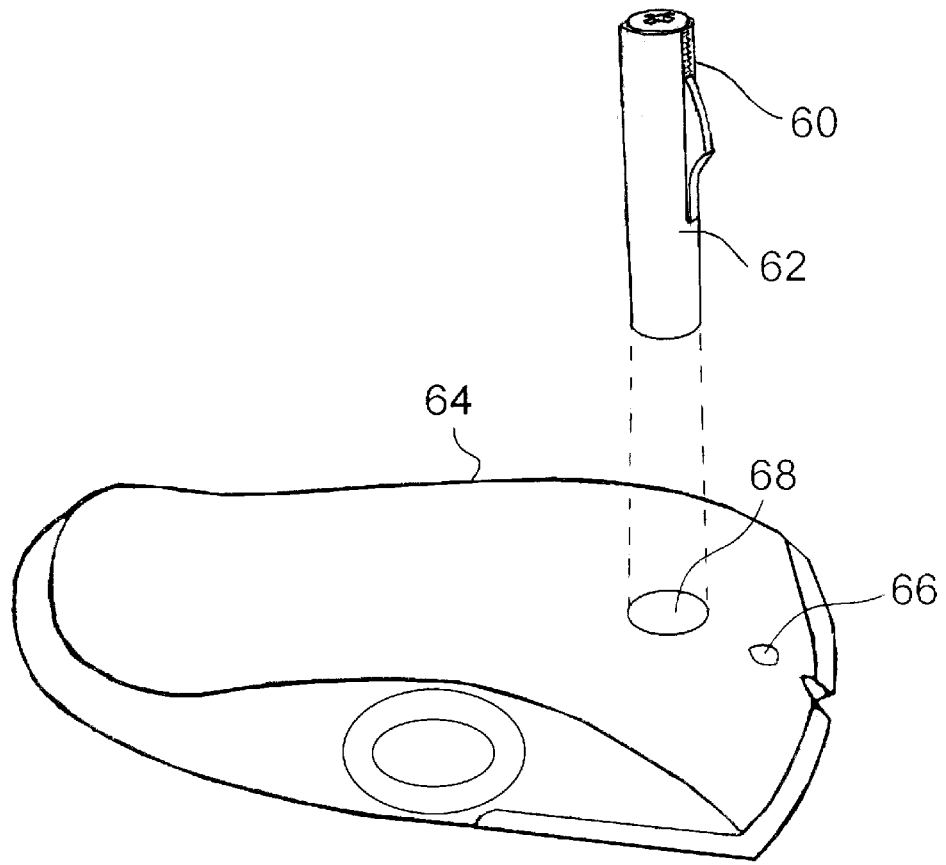
FIG. 6 is a perspective view of an alternate embodiment of the present invention.

Referring to FIG. 6, such an alternate embodiment is shown. In this embodiment, the marking mechanism 60 is an independent tool. The marking mechanism 60 can be used in place of a pencil or a pen to mark any surface. The marking mechanism 60 has a linear guide 62 that is tubular in shape and is not part of any other device. The internal workings of the marking mechanism 60 are identical to those previously illustrated and described in FIGS. 1-4.

Also illustrated in FIG. 6 is a stud finder assembly 64. The stud finder assembly 64 locates studs behind drywall in the traditional manner. When a stud is located, both a sound and a light indicator 66 activates.

A cavity 68 is formed in the stud finder assembly 64 that is sized and shaped to receive the marking mechanism 60. When the marking mechanism 60 is placed inside the cavity 68, the marking mechanism 60 can be used to mark a wall whenever a stud is found. In this manner, a person can both operate the stud finder assembly 64 and mark the wall at the location of a stud using only one hand.

From the above disclosures, it will be understood that a line of tools can be produced, wherein each of the tools is adapted to selectively receive the marking mechanism. Such tools can include tape measures, angle measures, depth gauges, stud finders, and many other tools that are used to measure distance, depth, position, location or imprint.

In view of the above, it will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A device for depositing a dust mark on a surface, comprising:
    a linear guide having a first end, a second end, and a stop proximate said second end;
    a dust receptacle that reciprocally moves along said linear guide between said stop and a point a predetermined distance above said stop, wherein said dust receptacle defines an interior chamber and has a discharge opening that leads into said interior chamber;
    marking dust disposed in said interior chamber of said dust receptacle;
    a biasing element that biases said dust receptacle against said stop with a predetermined biasing force;
    a mechanism for applying force to said dust receptacle in excess of said predetermined biasing force, therein moving said dust receptacle away from said stop along said linear guide into a cocked position, wherein when released from said cocked position, said biasing element rapidly moves said dust receptacle along said linear guide to said stop, causing a volume of said marking dust to exit said discharge opening and travel past said second end of said linear guide to mark a surface.

2. The device according to claim 1, wherein said mechanism is a engagement tab that extends away from said linear guide, therein providing a surface to manually engage and move said dust receptacle toward said cocked position.

3. The device according to claim 1, wherein said discharge opening includes a narrow slot.

4. The device according to claim 3, wherein said slot tapers from a wide side that faces into said dust receptacle to a narrow side that faces away from said dust receptacle.

5. The device according to claim 1, wherein said linear guide is tubular and said dust receptacle linearly moves within said linear guide.

6. The device according to claim 1, wherein said dust receptacle has a removable closure that enables said marking dust in said dust receptacle to be opened for replenishment.

7. The device according to claim 1, wherein said predetermined distance separates said stop from said second end, therein preventing said dust receptacle from reaching said second end when released from said cocked position.

8. A tape measure device for making and marking a measurement on a surface, said assembly comprising:
    a housing;
    a measurement tape wound within said housing, wherein said tape can be selectively extended from said housing past a reference line;
    a dust receptacle having an interior chamber and a discharge opening that leads into said interior chamber, wherein said discharge opening is aligned with said reference line;
    marking dust within said interior chamber of said dust receptacle;
    a displacement mechanism for displacing said dust receptacle and causing said marking dust to exit said discharge opening and mark said surface at a position that corresponds to said reference line.

9. The device according to claim 8, further including a linear guide, wherein said dust receptacle moves along said linear guide.

10. The device according to claim 9, wherein a stop is positioned on said linear guide, wherein said displacement mechanism includes a biasing element that biases said dust receptacle against said stop with a biasing force, wherein said dust receptacle can be cocked against said biasing force.

11. The device according to claim 8, wherein said discharge opening includes a narrow slot that is aligned with said reference line.

12. The device according to claim 11, wherein said slot tapers from a wide side that faces into said dust receptacle to a narrow side that faces away from said dust receptacle.

13. The device according to claim 8, wherein said linear guide is tubular and said dust receptacle linearly moves within said linear guide.

14. The device according to claim 8, wherein said dust receptacle has a removable closure that enables said marking dust in said dust receptacle to be opened for replenishment.

15. A method of marking a surface with a deposit of dust, said method comprising the steps of:
    providing a dust receptacle that defines an interior chamber, wherein said interior chamber has a discharge opening of a predetermined shape;
    at least partially filling said dust receptacle with marking dust;

impacting said dust receptacle proximate said surface to cause said marking dust to exit said discharge opening, travel across a gap and be deposited on said surface in a pattern that mimics said predetermined shape.

16. The method according to claim 15, wherein said gap is between $1/64^{th}$ of an inch and $1/16^{th}$ of an inch thick.

17. The method according to claim 15, wherein said step of impacting said dust receptacle proximate said surface, includes positioning said dust receptacle in a linear guide, cocking said dust receptacle against a bias, and releasing said dust receptacle, wherein said bias moves and impacts said dust receptacle against a stop.

* * * * *